Jan. 9, 1962 A. P. OLSON 3,016,316
LAMINATED BOARD CONSTRUCTION
Filed Dec. 22, 1958

INVENTOR.
ARNOLD P. OLSON
BY
Gustav Miller
ATTORNEY

3,016,316
LAMINATED BOARD CONSTRUCTION
Arnold P. Olson, 512 Hannifin, Bismarck, N. Dak.
Filed Dec. 22, 1958, Ser. No. 782,286
4 Claims. (Cl. 154—45.9)

This invention relates to laminated structures, and it more particularly relates to laminated structures utilizing laminated boards of plywood or the like.

Laminated boards such as plywood are very effectively used for ply deck roofing or the like where maximum strength combined with lightness of weight and inexpensiveness is desired. However, one of the problems inherent in this type of construction is to provide a sufficiently strong joint between the boards to permit relatively long lengths of boards to be used. Heretofore, such joints could not be made sufficiently strong for longer board lengths; consequently, the boards had to be used in relatively short lengths. This required a number of end joints or splices between the boards. These end splices generally had to be made in staggered relation to each other between each pair of beams or rafters. This was because these prior, relatively short boards could not extend beyond more than two spaced beams or rafters, especially when the spacing was great.

Furthermore, the prior type laminated boards, comprising a plurality of plies arranged in staggered relationship to form tongues and grooves, generally were defective in that these tongues and grooves did not quite match even when the plies were cut in short lengths from a common board.

Another disadvantage of the prior type of laminated boards was that they did not provide a smooth and non-apparent joint while yet maintaining a strong and effective connection between the boards at the joint. It is one object of the present invention to overcome the above and other disadvantages of the prior type laminated boards by providing a laminated board structure which may be made in relatively long lengths while yet being capable of being strongly secured to adjacent boards of the same type.

Another object of the present invention is to provide a laminated board having tongues and grooves which match each other.

Another object of the present invention is to provide a laminated board which can be effectively and sturdily joined to other boards of the same construction in such a manner that the joints are not overly apparent while yet being strongly secured.

Other objects of the present invention are to provide an improved laminated board, of the character described, that is easily and economically produced, which is sturdy in construction, and which is highly efficient in operation.

With the above and related objects in view, this invention consists in the details of construction and combination of parts, as will be more fully understood from the following description, when read in conjunction with the accompanying drawing in which.

Figure 1:
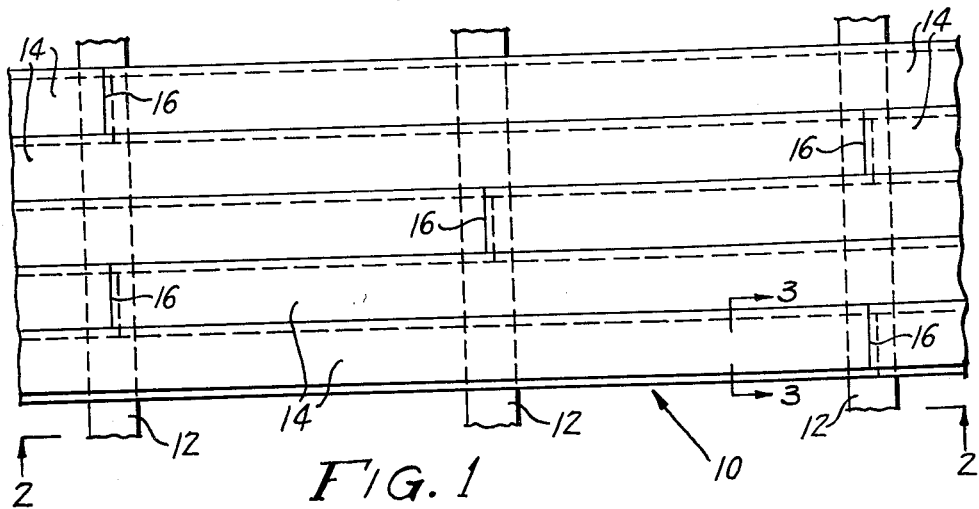
FIG. 1 is a fragmentary top plan view of a ply deck roof constructed of laminated boards embodying the present invention.
Figure 2:
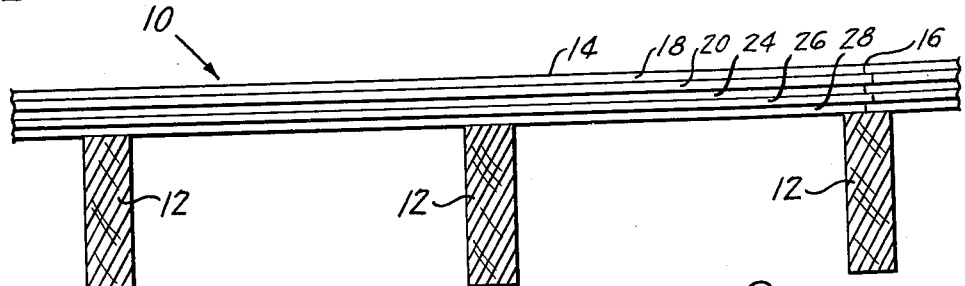
FIG. 2 is a side elevational view taken on line 2—2 of FIG. 1.

Referring in greater detail to the drawing wherein similar reference characters refer to similar parts, there is shown a roof structure, generally designated 10, comprising rafters 12 supporting boards 14.

As illustrated, each board 14 extends from one rafter 12 over the next adjacent rafter 12 and onto a third rafter 12. The ends of each board 14 is joined to an aligned board 14 above a rafter 12 as indicated by joints 16. These joints 16, by being all placed in conjunction with a rafter 12, are effectively supported by such rafters.

Each board 14 comprises five strips or plies 18, 20, 22, 24 and 26. These strips are each laterally tapered in accordance with their relative positions and are alternately offset from each other to provide alternate grooves 28 and alternate tongues 30 on each side, the grooves on one side being in the same plane as the tongues on the other side and vice versa.

Figures 3, 4:
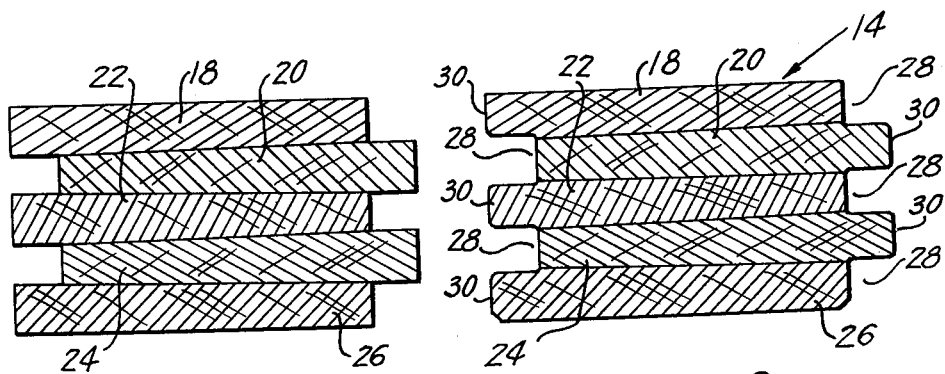
FIG. 3 is a sectional view taken on line 3—3 of FIG. 1.
FIG. 4 is a sectional view, similar to FIG. 3, but showing the board before being planed down to finished size.

As illustrated in FIG. 4, the strips 18 to 26 are originally provided with predetermined tapers so that sufficient material is provided on each side to permit planing of the extending strips to form the matched tongues 30 and grooves 28 shown in FIG. 3. For example, strip 18 may have a taper extending from about 24/32 to 26/32 inch, thereby, providing a 1/32 inch taper, while the strip 20 extends from 5/8 to 3/4 inch, the strip 22 extends from 3/4 to 5/8 inch, the strip 24 extends from 5/8 to 3/4 inch and the strip 26 extends from 3/4 to 5/8 inch. These dimensions are, of course, for illustrative purposes only. After the strips 18 to 26 are bonded in place with any type of desired waterproof adhesive, the recesses formed between the extending edges of the strips can be worked into matching shaped grooves 28 which automatically also shapes the extending edges into matched tongues 30. The ends of each such formed laminated board 14 are provided with standard type splice constructions in the ordinary manner.

Boards 14 of the above construction can be manufactured in standard sizes and dimensions so that they can easily be joined as in FIG. 1. Furthermore, the tongues and grooves are sufficiently large to sturdily support the joined edges of adjacent boards 14 while the grooves are yet not so deep as to detract from the overall strength of the boards.

In the construction shown, the upper strips 18 to 24 can be chosen for their strength factor while the exposed strip 26 can be chosen for beauty. Furthermore, with the use of a high moisture-resistant glue, the four upper plies 18 to 24 will constitute four vapor receivers to help keep warpage to a minimum.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. A laminated board comprising a plurality of longitudinally extending alternately laterally offset, superimposed plies, each ply having a predetermined lateral taper, said alternately offset plies forming alternate tongues and grooves on each lateral edge of said board, the wider edges of the plies providing the tongues, the surfaces of said tongues and the walls of said grooves being each cut away to provide parallel complementary surfaced tongues and grooves, the tongues on one edge being in a common plane with the grooves on the opposite edge, and said tongues and grooves having matching contours.

2. The board of claim 1 wherein the contours of said tongues and grooves intersect the inclined planes of the corresponding tapered plies.

3. A method of making a laminated board which comprises superimposing a plurality of laterally tapered plies of predetermined proportions one upon the other in alternately laterally offset relationship to form alternate tapered extensions having their wider ends outwardly of the board, said extensions being separated by recesses having their narrower ends outwardly of the board, and thereafter cutting away the surfaces of the tapered extensions to form predeterminedly-shaped tongues from the extensions and grooves from the recesses complementary to the tongues.

4. A laminated board comprising a plurality of overlying plies of substantially similar widths, alternate overlying plies being somewhat laterally displaced from the intermediate plies thereby providing alternate tongues and grooves along the longitudinal edges of said board, said plies being formed with pre-determined laterally extending tapers with the thicker edges providing the tongues and the thinner edges recessed within the grooves, the wall surface of said extending tongues being somewhat cut away and providing parallel complementary-surfaced tongues and grooves.

References Cited in the file of this patent

UNITED STATES PATENTS

| | | |
|---|---|---|
| 2,104,089 | Marks | Jan. 4, 1938 |
| 2,281,148 | Freedlander | Apr. 28, 1942 |
| 2,283,582 | Scherer | May 19, 1942 |
| 2,336,235 | Fischer | Dec. 7, 1943 |
| 2,680,698 | Schnee | June 8, 1954 |